No. 712,032. Patented Oct. 28, 1902.
F. J. BAKER.
FISH HOOK.
(Application filed July 26, 1901.)
(No Model.)

Witnesses
R. F. Storm
I. J. Masson

Inventor
Frank J. Baker
By E. E. Masson
Attorney

UNITED STATES PATENT OFFICE.

FRANK J. BAKER, OF ST. CLOUD, MINNESOTA.

FISH-HOOK.

SPECIFICATION forming part of Letters Patent No. 712,032, dated October 28, 1902.

Application filed July 26, 1901. Serial No. 69,777. (No model.)

*To all whom it may concern:*

Be it known that I, FRANK J. BAKER, a citizen of the United States, residing at St. Cloud, in the county of Stearns and State of Minnesota, have invented certain new and useful Improvements in Fish-Hooks, of which the following is a specification, reference being had therein to the accompanying drawings.

This invention relates to what are known as "weedless" hooks, which are provided with means for preventing them from catching and gathering weeds or grass while they are drawn through the water.

The object of this invention is to provide a fish-hook with a loop of light spring-wire having its two ends rigidly secured to the upper end of the shank of the hook by means of solder or by means of a fine wire coiled around said parts, the looped portion receiving the barbed end of the hook, protecting both sides thereof. The shank of the hook, its looped lower end, and its barbed end form, together with the looped wire protector, an inclosure substantially like a letter O, against the sides of which water-grass will slide and not enter into engagement with the hook, although permitting the jaws of a fish to easily press the looped wire toward the shank of the hook and disclose its barbed end. I attain these objects by the construction illustrated in the accompanying drawings, in which—

Figure 1:
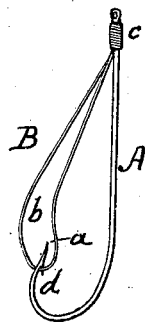
Figure 2:
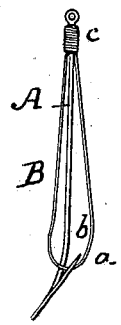
Figure 3:
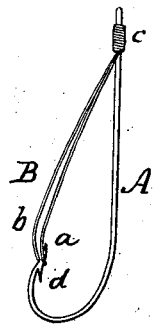

Figure 1 is a perspective view of a fish-hook provided with a guard constructed in accordance with my invention. Fig. 2 is a front view of the same. Fig. 3 is a side view of the same.

In said drawings, A represents the fish-hook proper, and B the looped guard to ward off weeds and water-grass and keep them from coming in contact with the front or with the sides of the point of the hook. This guard consists of a piece of spring-wire not folded tightly upon itself, but bent in the middle of its length to form an open loop $b$ to leave considerable space between it and the two sides of the point $a$ of the hook. The ends of the wire forming the guard B are rigidly secured to the upper end of the stem of the hook by means of a fine wire coiled around said parts or preferably by means of solder $c$. The two branches of the guard B are of such length that the loop portion $b$ rests against and in contact with the inside of the hook between its point $a$ and its barb $d$, and the lower portion of the guard B is bowed toward the shank and forms with the latter an inclosure which is pear shape, but substantially closed, like a letter O, by the looped wire of the guard. It will be observed from the drawings that the middle portion or substantially such portion of the wire guard is normally disposed in advance of the hook and that the free end or loop is bent inwardly in the direction of the shank and rests transversely against and in contact with the hook between its point and its barb.

The looped guard is constructed of spring-wire of such strength that it will successfully resist the pressure of water-grass against the hook, but will yield when the hook is taken by a fish, and it does not come in contact with the point of the hook, nor does it straddle the bottom loop of the hook.

Having now fully described my invention, I claim—

The combination with a fish-hook, of a weed deflector or guard, consisting of a spring-wire doubled upon itself to constitute a loop and having its two ends rigidly secured to the shank of the hook, said guard having substantially its middle portion disposed in advance of the hook and having its free end or loop bent inwardly or in the direction of the shank and resting transversely against and in contact with the hook between its point and its barb, substantially as described.

In testimony whereof I affix my signature in presence of two witnesses.

FRANK J. BAKER.

Witnesses:
ANDREW C. ROBERTSON,
JOSEPH SCHELLINGER.